United States Patent
Forrer

[11] Patent Number: 6,161,826
[45] Date of Patent: Dec. 19, 2000

[54] UNIT FOR RELEASABLY ATTACHING PARTS AND PALLETIZING APPARATUS FOR IT

[75] Inventor: Fritz Forrer, Herisau, Switzerland

[73] Assignee: Parotec AG, Flawil, Switzerland

[21] Appl. No.: 09/210,258

[22] Filed: Dec. 10, 1998

[30] Foreign Application Priority Data

Dec. 11, 1997 [EP] European Pat. Off. .............. 97121794

[51] Int. Cl.[7] .................................................. B23Q 3/00
[52] U.S. Cl. ........................... 269/309; 269/900; 269/310
[58] Field of Search ................................... 269/309, 289, 269/310, 900

[56] References Cited

U.S. PATENT DOCUMENTS

| | | | |
|---|---|---|---|
| 4,500,079 | 2/1985 | Morghen | 269/309 |
| 5,190,272 | 3/1993 | Zika et al. | 269/309 |
| 5,415,384 | 5/1995 | Obrist et al. | 269/309 |
| 5,662,317 | 9/1997 | Beakes et al. | 269/309 |
| 5,918,870 | 7/1999 | Stark | 269/309 |
| 5,961,261 | 10/1999 | Stark | 269/309 |

FOREIGN PATENT DOCUMENTS

| | | |
|---|---|---|
| 0111092 | 6/1984 | European Pat. Off. . |
| 0267352 | 5/1988 | European Pat. Off. . |
| 0555810 | 8/1993 | European Pat. Off. . |
| 3743894 | 7/1989 | Germany . |
| 3919077 | 7/1990 | Germany . |
| 9203992 | 5/1992 | Germany . |
| 4135418 | 5/1993 | Germany . |
| 4341046 | 6/1995 | Germany . |
| 8810172 | 12/1998 | WIPO . |

OTHER PUBLICATIONS

Patent Abstracts of Japan vol. 10, No. 196 (M–497) '2252!, Jul. 10, 1986 & JP 61 038837 A (Katsuhiro Yoshie) Feb. 24, 1986.

Primary Examiner—David A. Scherbel
Assistant Examiner—Lee Wilson
Attorney, Agent, or Firm—Martin A. Farber

[57] ABSTRACT

A unit for releasably attaching parts of a palletizing system comprises two coupling elements to be fastened together between which a connection arrangement is provided for clamping the coupling elements in the direction of a clamping axis as well as an elastic radial orienting arrangement. The elastic radial orienting arrangement includes a springy device allowing relative displacement between the coupling elements transversely to the clamping axis, but provides centering forces in radial direction with respect to the clamping axis which act upon the coupling elements when they are clamped together.

36 Claims, 2 Drawing Sheets

UNIT FOR RELEASABLY ATTACHING PARTS AND PALLETIZING APPARATUS FOR IT

FIELD OF THE INVENTION

The present invention relates to a unit for releasably attaching parts of a palletizing system, comprising two coupling elements, a connection arrangement for clamping these coupling elements in the direction of a predetermined clamping axis which passes centrally through the elements, and an elastic radial orienting arrangement.

BACKGROUND OF THE INVENTION

When machining parts and components, either the parts to be machined and/or the tools for machining are connected to adjustment devices or to the machines by means of palletizing devices. These palletizing devices comprise each at least one pallet and at least one pallet counter-plate or pallet receiver to be interconnected onto which either the part to be machined or the corresponding tool is fastened. The advantage of palletizing consists in that the, thus, palletized objects can be placed and secured, particularly automatically, in a well-defined position onto several machines for adjustment, machining or measuring with a minimum expenditure. Therefore, a number of different palletizing apparatus are known according to the prior art.

In principle, each palletizing apparatus comprises some units consisting of two coupling elements to be interconnected and a connection arrangement for clamping these coupling elements in the direction of a predetermined clamping axis which passes centrally through the elements. Apart from any releasable interconnection of the coupling elements, a palletizing system should enable a defined orientation with respect to coordinates at least in one direction. The clamping axis is generally considered to be the z-axis whose zero point is defined by z-contact surfaces. In order to ensure a well-defined orientation of the respective x-axis or y-axis which are perpendicular to the z-axis, there is at least one orienting arrangement.

From DE-A-41 35 418, a connection device is known which achieves clamping of the coupling elements through a bolt and recess arrangement wherein springs press balls of a ball cage into a groove of the bolt. For releasing the connection, the clamping force of the springs is overcome by a hydraulic plunger.

There are other systems which comprise several coupling elements, particularly four, on each the pallet and the pallet receiver, the coupling elements ensuring clamping of the zcontact surfaces, but allowing some tolerance in x- and y-direction. In order to ensure a well-defined x- and y-orientation, a pair of orientation elements for each orientation axis are fixed to the pallet and the pallet receiver, the elements of one of the latter parts, i.e. the elements of the pallet, but optionally those of the pallet receiver, are resilient, while the respective complementary one, i.e. that of the pallet receiver or that of the pallet, is rigid. These orientation elements for the x- and y-orientation, when interconnected, allow some expansion or shrinking displacement along the respective axis, the point of intersection of the x- and the y-axis, however, remaining stationary, thus forming a zero point, while any turning movement about the z-axis is prevented by engagement transversely to the respective orientation of two of each interconnected pairs of orientation elements in x- and y-direction. Such a palletizing device is based on a standard pallet size defined by the arrangement of the orientation elements. Each pallet has to extend at least over the region of the orientation elements. This means that another set of orientation elements have to be provided for smaller pallets. Although, with pallets extending over the double length of a standard pallet, two x-y-orientation systems could by arranged side-by-side, but this would cause problems due to redundancy and two interconnected zero points when the pallet and the pallet receiver elongate differently. Moreover, manufacture of such pallets and pallet receivers is very expensive, because the orientation elements have to be arranged individually in a highly precise manner. In addition, this known palletizing device is not adaptable to individual needs.

Constructive solutions are also known in which x-y-orientation is effected by the coupling elements. One unit is provided with two interconnectable coupling elements fitting very precisely and defines a common zero point. The units along an x-axis and an y-axis leading through this zero point have some tolerance in the direction of the x- or y-axis, but are substantially free from any play transversely to the x- or y-axis. Units which are neither situated on the x-axis nor on the y-axis have to have some play in all directions. If a pallet receiver and a corresponding pallet is to be built up with four units or four coupling elements each, three different types of units have to be used, i.e. in the zero point a matching zero point unit, along the axes units which have some tolerance in the axis' direction, and beside the axes units having some play or tolerance in all direction of the x-y-plane. With such units, it is possible to build up palletizing devices of various size, but the use of three different types of units is awkward and favors mistakes.

A coupling device or unit is known from EP 0 111 092 B1 which ensures centricity corresponding to the use of conical seats as well as a well-defined angular position relative to interconnected members or coupling elements in a plane perpendicular to the central axis. Centricity and impossibility of any displacement transversely to the central axis is ensured by a conical trunnion which is pressed into a fitting, precisely circular opening of a disk fastened to one of the members. The marginal edge is somewhat deformed central symmetrically upon clamping. Deformation transversely to the axis is prevented by inherent stability of the circular opening and the disk area surrounding the opening completely. To maintain the angular position precisely, an eccentrically arranged oval opening having radius parallel margins is formed in the disk, while another conical trunnion is provided on the other member so as to be pressed into the oval opening. In order not to affect centering by the second trunnion, a slot is formed within the disk which extends between the two openings. Exact positioning on different machines is only possible, if both trunnions and the two openings are machined very exactly and the disk is mounted with high accuracy. Both members are interconnected by a centrally arranged clamping screw. By this approach, the zero point is not maintained by two intersecting fixed axes, as mentioned above, but by a point-wise fixation. In addition, the axis extending through the point fixation is fix. Thus, the use of a plurality of such coupling devices on a palletizing device is not possible or not suitable due to redundancy problems.

EP-B-0 267 352 discloses another approach in which highly precise coupling of two parts is achieved even if one of the interengaging parts is formed resiliently with some tolerance. One of the parts comprises pillow block-like elements arranged in a circle around the zero point and having grooves which point radially away from the zero point. The grooves are resilient so that precisely arranged profiles of the other part can deform the grooves slightly in peripheral direction when the profiles are inserted into the grooves. In order to ensure precise positioning with respect to the x- and y-axes even with some tolerances in manufacture, at least three grooves and, correspondingly, three profiles have to be provided in equal angular distances around the zero point. The elasticity of the grooves is only provided in order to make the parts interconnectable even with small inaccuracies of one of the parts. The elasticity should be, however, not so that the zero point is not sufficiently precisely defined. Since the zero point and the angular orientation are fixed very precisely with one unit of two interconnectable parts only, the use of a plurality of such coupling devices on an individual palletizing apparatus is not suitable due to redundancy problems. In addition, machining the highly precise part having a prolongation in z-direction and of profiles extending radially from the latter in precisely defined directions is very expensive. The pillow block-like elements having elastic properties transversely to the radially extending groove involves high expenditure in manufacture and assembly.

SUMMARY OF THE INVENTION

It is an object of the present invention to find a unit for releasably attaching parts to a palletizing system which is simple in construction and is most versatile.

This object is achieved according to the invention by an elastic radial orienting arrangement which includes a spring device allowing relative displacement of the two interconnected coupling elements in a direction transversely to the clamping axis, but providing centering forces in radial direction with respect to the clamping axis which act between the coupling elements when they are clamped together. Likewise, a palletizing system using at least one of these units overcomes the disadvantages of the prior art.

It has been recognized that the radial orienting arrangement should include a springy device that allows relative displacement of the two interconnected coupling elements in a direction transversely to the clamping axis, but proves centering forces in radial direction with respect to the clamping axis. With such a springy device definition of the zero point by an exactly coupled unit or by an orientation arrangement which defines two axes perpendicular to the z-axis is no longer necessary. To define only one zero point, one unit is sufficient. The centering springy device ensures centering during clamping procedure. In clamped condition, the zero point remains fixed even if some forces act transversely to the z-axis between the two coupling elements of a unit. Defining a zero point and an angular orientation transversely to the z-axis is effected by using at least two units. If two or more units according to the invention are used in a palletizing device, there are no redundancy problems, because centering of each unit is effected resiliently which, upon clamping, can compensate small axis deviations between the coupling elements assigned to each other. Fixing at the end of clamping procedure defines the zero point and the angular orientation.

The unit according to the invention ensures precise centering of the clamping or tool axis when used individually, such as for receiving a tool or for holding the collet chuck. In addition, units according to the invention enable any palletizing device desired to be built. Palletizing apparatuses can be built by users, for example by forming pocket holes into the pallet receiver and the pallet using a gauge, coupling elements of the unit according to the invention being inserted into these pocket holes. The user has to employ only one type of unit, thus excluding any confusion. In addition, the rotational orientation of the coupling elements about the clamping axis does not make any essential difference. If now the user has only to be provided with the units, any additional transport of pallets and pallet receivers or of the material for them can be omitted. The springy device may be used together with any type of connection or clamp.

The springy device, which allows displacement transversely to the clamping axis and provides centering forces upon clamping, can be formed in a simple manner. For exampie, at least three, preferably four, but optionally six, spring portions arranged in substantially equal angular distances along a circular line around the clamping axis project radially against an abutment surface of the second coupling element which extends circularly around the clamping axis. When clamping, the spring elements in contact with the abutment surface are elastically deformable in such a way that radial centering forces are generated between the spring portions and the abutment surface. The spring elements can, for example, initiate from a central region and extend radially in outward direction, as will be described later with reference to the drawings, or vice-versa initiating from an outer ring they can project radially inwardly against an inner, e.g. circular, abutment surface. The spring elements are separated in the region of the abutment surface, thus being enabled to deform independently which is necessary in case of displacements transversely to the clamping axis.

It will be understood that the spring elements, in order to attain the desired spring characteristics, may extend also in tangential or any other direction in a plane perpendicular to the clamping axis or even inclined to this perpendicular plane in untensioned condition. The abutment surface will, in all cases, be adapted to the spring elements. Optionally cooperating spring elements are provided on both interconnectable coupling elements. Furthermore, it is possible that the centering spring arrangement is not situated within the range of contact of the cooperating coupling elements, but in one or both coupling elements, or even between a coupling element and the pallet or the pallet receiver. The spring element may be formed integrally with a coupling element or the pallet or pallet receiver (the latter two embodiments being not preferred) or separately. Decisive is only that there is a spring effect which provides a force component in radial direction.

The unit according to the invention is simple in construction and, consequently, easy to manufacture. The springy centering arrangement may be formed directly on the connection arrangement, and, therefore, need not to be fastened separately to the pallet or the pallet receiver in an additional step. The units according to the invention can be used both with extremely high precision requirements as well with low ones. With a high precision requirement, pallets and pallet receivers are handled in conditioned rooms of constant temperature so that no elongation or shrinking have to be compensated. Thus, the springy devices ensure always a centered clamping connection between the coupling elements used. With a low precision requirement, pallets or pallet receivers may be elongated or shrinked to a different extent so that coupling elements of adjacent units do not correspond to each other with respect to their centers. Nevertheless, the spring elements enable matching of the coupling elements, the average deviation of the centers being substantially minimized in all units by the sum of all centering forces.

BRIEF DESCRIPTION OF PREFERRED EMBODIMENT

In the following, the unit according to the invention as well as a pallet device using it will be described with reference to the drawings in which FIG. 1 is a cross-section of a unit along the line A—A of FIG. 2;

DETAILED DESCRIPTION OF THE DRAWINGS

Figure 1:
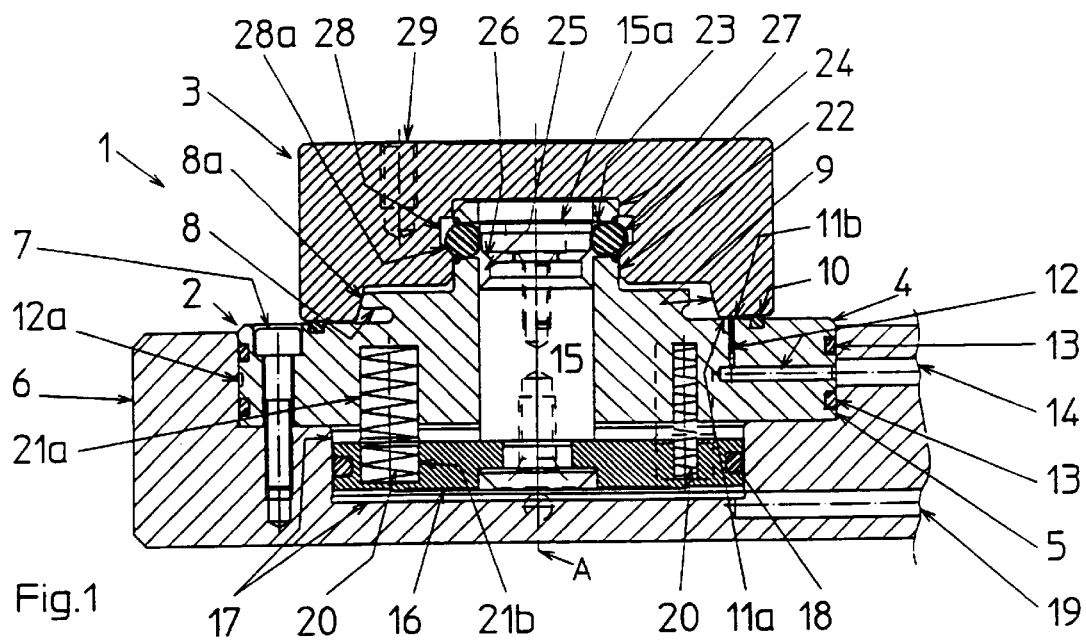
Figure 2:
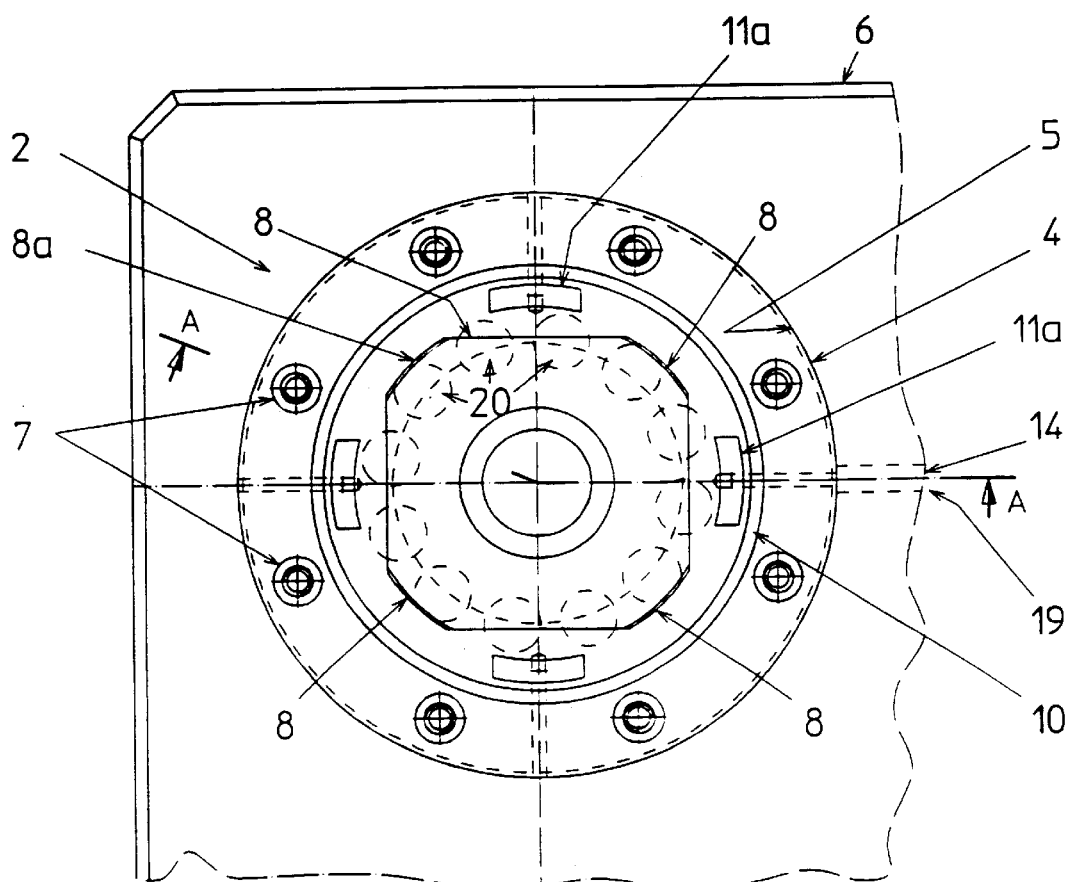
FIG. 2 is a plan view onto a detail of a pallet receiver showing a coupling element which includes four spring portions.

FIGS. 1 and 2 show a unit 1 composed of a first coupling element 2 and a second coupling element 3. The first coupling element 2 comprises a first disk portion 4 having an axis A, a cylindrical portion of which being inserted into a first pocket hole 5 of a pallet receiver plate 6 (or analogously of a pallet) and is fastened by fastening screws 7. A springy arrangement having four, optionally three or more than four, particularly six, radially protruding spring portions 8 is formed on the first disk portion 4 averted from the plate 6 in the direction of axis A. The spring portions 8 are arranged substantially regularly and in equally spaced relationship along in a circle around the axis A. The radially outer free ends 8a of the spring portions 8, due to their spring characteristic, are deflectable in axial direction. The second coupling element 3, which is connected or integral with the first disk portion 4, comprises an abutment surface 9 extending annularly around the clamping axis A, the abutment surface 9 being formed preferably by an inner surface of an annular portion of the disk 4, although modifications, such as a more centered version, will easily be made by those skilled in the art. It is clear, however, that, since the contact surface 9 will at least help in defining the zero point, it is preferred to have the contact surface formed as a radial outer surface. The free end portions 8a of the spring arrangement 8 engage the abutment surface 9 during clamping procedure and in clamped condition. The radial outer surfaces of the end portions 8a and the abutment surface 9 are preferably conical, as is especially shown when looking at the abutment surface 9 in FIG. 1, and have, in particular, the same conicity.

During clamping, the two coupling elements 2 and 3 are moved in axial direction towards each other. In doing this, the spring 8 is slightly bent along bending lines extending transversely to the clamping axis A, in other words, the end portions 8a are entrained slightly in axial direction by the abutment surface 9. If the axis of the first disk portion 4 and the axis of the second coupling element 3 are not exactly in conformity with each other, not all of the spring portions 8a are bent in the same way so that the unequal restoring forces generated in this way result in a radial centering force in cooperation with the two coupling elements 2 and 3.

In order to avoid centering deviations due to dirt and to prevent fouling of the spring 8 and/or the abutment surface 9, a first sealing 10 is suitably arranged in a circular configuration between the front surfaces or contact surfaces of the first and second coupling element which engage each other in axial direction and externally in radial direction with respect to the abutment surface 9.

The first sealing 10 extends preferably also around z-contact surfaces 11a, 11b at the front sides of the first and second coupling elements 2 and 3 so that these surfaces too are protected against dirt and particles, which form as a result of machining a part. The orientation of the z-axis is determined and defined by the interengaging z-contact surfaces 11 a and 11 b of the first and second coupling element 2 and 3.

The z-contact surfaces 11 a and 11 b can be cleaned according to the preferred embodiment shown by pressurized air to which end optionally at least one air supply channel 12, but preferably several ones, particularly in equal angular distances around the axis A, for supplying pressurized air are provided. Alternatively, a hydraulic cleaning medium can be used, but is not preferred. These pressurized air supply channels 12 have preferably an orifice at the z-contact surface 11 a. Thus, they can be used for monitoring coupling of the two elements 2 and 3, because, in coupled condition, the z-contact surface 11b would cover the orifices in the z-contact surface 11a. Thus, when coupling a pressure sensor and/or a flow sensor to the supply channel 12, lower pressure and/or a higher flow rate will be sensed when the orifice of the channel 12 is open than when the contact surfaces 11a, 11b engage each other and close this orifice. Thus, the monitored actual value of pressure and/or flow rate could be supplied to a comparator stage which, comparing it with a nominal value or threshold value, can determine the clamping condition and, e.g. actuate an alarm device. Moreover, the orifice of the channel 12, especially if arranged otherwise so that supplied fluid can emerge all or part of the time of operation, can be used as an additional sealing means by providing a certain internal pressure between the coupling elements and a flow to outside which prevents dirt and particles from entering. The pressurized air supply channel(s) 12 in the first disk portion 4 comprise preferably an annular channel 12a in the cylindrical outer surface of the disk portion 4 which is axially sealed at both sides by second sealings 13 and which may be fed with pressurized air by a supply conduit 14 in the plate 6.

The two coupling elements 2 and 3 could be interconnected simply by a screw. It is preferred, however, that an automatic actuable clamping device is used which is, optionally, able to clamp and/or relieve clamping mechanically. Most preferred is, however, to use a clamping device which employs spring elements for clamping and a fluid actuated relief device which acts against the force of the spring elements. This relieving action is effected either pneumatically or hydraulically by an appropriate cylinder-and-piston arrangement, a preferred embodiment of which is described below.

In the embodiment shown, a bolt 15 passes a central bore of the first disk portion 4, the bolt 15 being connected to a second disk portion 16 which is inserted into a second pocket hole 17 adjoining coaxially to the first one to be moved as a piston therein. A piston sealing ring 18 in the cylindrical external surface of the second disk portion 16 seals substantially tightly the cylinder space or secluded partial space of the second pocket hole 17, which is fed with a fluid through an actuation conduit 19. By pressurizing this cylindrical space, the second disk portion 16 is pressed against the first disk portion 4. However, the force of pressure springs 20 counter-acts this pressure. These pressure springs 20 are suitably arranged in equal angular distances around the axis A and provide a relative high pressure needed for clamping. In order to provide coupling elements 2 with a low over-all height in z-direction, the pressure springs 20 are received within spring bores 21a and 21b of the first and second disk portion 4 and 16. In clamping position, a distance is conveniently still existent between the first disk portion 4 and the second disk portion 16.

The first disk portion 4 comprises at its free end in axial direction facing the second coupling element 3 a ball retaining space 23 in a sleeve portion 22 of element 3 which extends beyond the spring elements 8a of spring 8. The ball retaining space may be formed as a ball cage for balls 24. Alternatively an elastic O-ring could be used instead of individual balls. Within the disk portion 4, the bolt 15 extends from the second disk portion 16 beyond the ball retaining space 23. Within the region of the ball retaining space 23, a bolt groove 25 with conical marginal surfaces is formed in the bolt 15, and adjoining the bolt groove 25 is a conical bolt pressure surface 26 formed in the region towards the free end of the bolt 15. The sleeve portion 22 can be inserted into a receiving bore 27 of the second coupling element 3 and can be released or removed from it if the second disk portion 16 is pressed against the first disk portion together with the bolt 15 by fluid pressure. In this release position of bolt 15, the bolt groove 25 is enlarging the ball retaining space 23 in radial direction so that the balls 24 can enter the bolt groove 25 and do no longer project to the cylindrical outer walls defining the sleeve portion 22. If an O-ring is used, as mentioned above, it would retract elastically in this release position into the groove 25. The receiving bore 27 of the second coupling element 3 comprises a receiving groove 28 extending annularly around the clamping axis A which has a conical pressure surface 28a, which, via the balls 24, is in pressure contact with the bolt pressure surface 26 when the coupling elements 2 and 3 are assembled. At the same time, the spring force of the springs 20 acts from the bolt pressure surface 26 via the balls 24 upon the pressure surface 28a of the receiving groove 28 in such a way that the z-contact surfaces 11b of the second coupling element 3 are pressed against the z-contact surfaces 11a of the first coupling element 2.

The bolt pressure surface 26 is preferably arranged on the bolt 15 in such a way that it is slightly displaceable in transverse direction to the clamping axis A to which end a bolt end portion 15a comprising the bolt pressure surface 26 may be appropriately fastened. In this manner, the bolt pressure surface 26 may adapt to a slight eccentricity if the two coupling elements 2 and 3 are coupled slightly eccentrically, thus preventing that centering by the spring 8 is affected by pressure.

Figure 3:
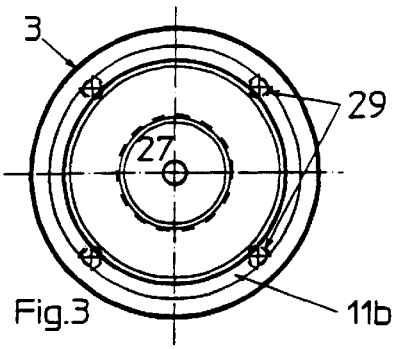
FIG. 3 is a bottom view of a coupling element of a pallet.

According to FIG. 3, the second coupling element comprises four z-contact surfaces 11b in correspondence with those of the first coupling element. In addition, threaded fasting bores 29 are represented which are formed in the second coupling element at the side averted from the z-contact surfaces 11 b. Comparing this figure with FIG. 1, it is apparent that these bores 29 can be used to fasten the second coupling element 3 to a pallet or any other component.

Figure 4:
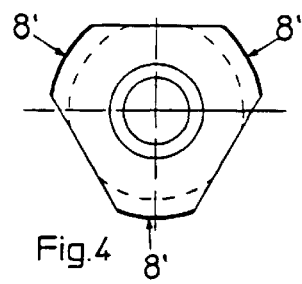
FIG. 4 is a plan view onto a spring device having three spring portions or prolongations.

FIG. 4 shows a spring arrangement having three protruding spring portions 8'. As already mentioned, the spring could optionally be formed separately from the first coupling element, but has then to be placed or secured to it without any play.

Figure 5:
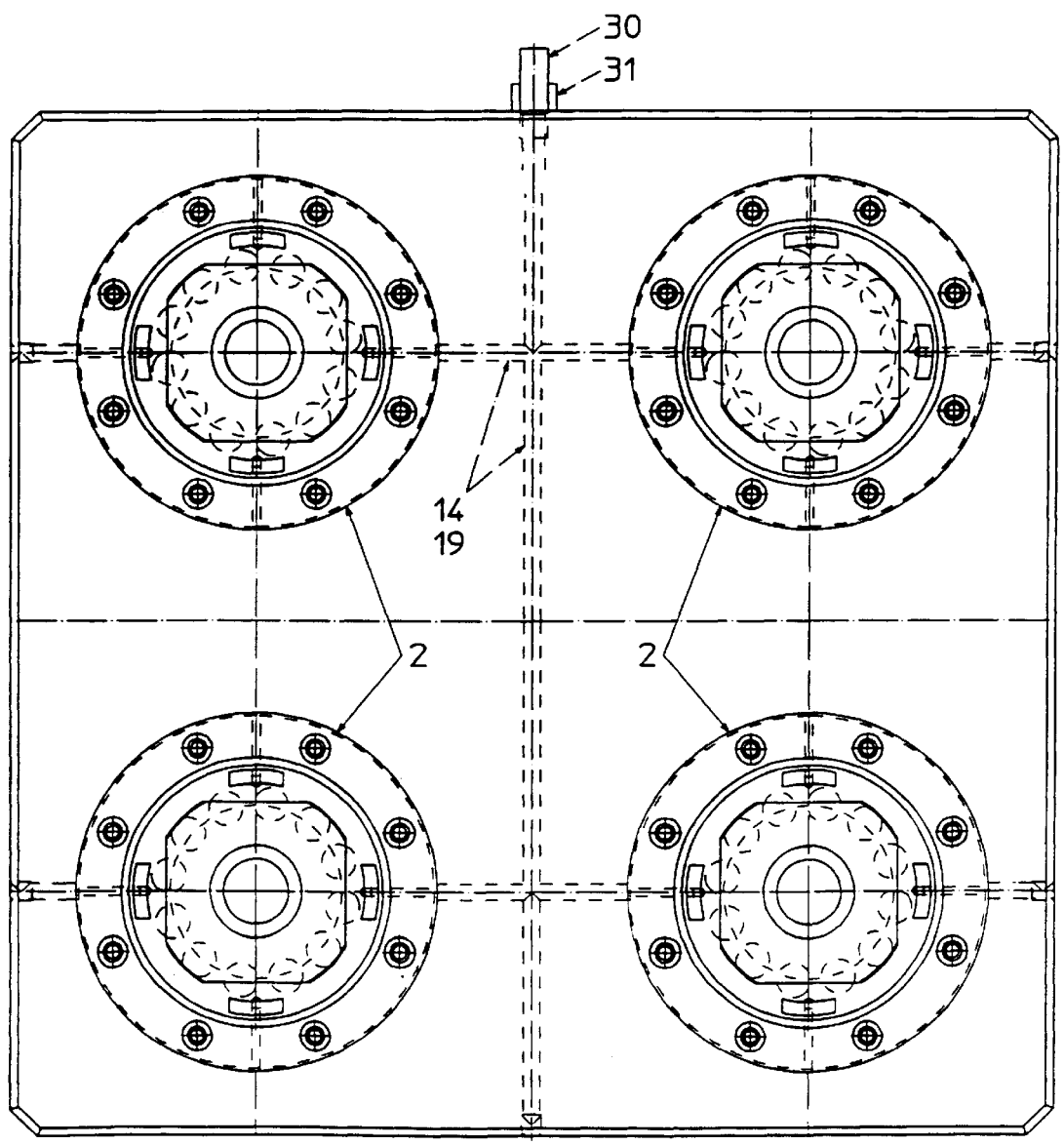
FIG. 5 is a plan view onto a pallet receiver or a pallet showing four coupling elements.

FIG. 5 shows a pallet or pallet receiver 6 and four first coupling elements 2 which are fed with pressurized air or any other actuation fluid through conduits 14 and 19. Two joints 30 and 31 connecting the conduits with source of fluid are preferably superposed in an edge surface of the pallet or pallet receiver plate 6. It will be understood that the first and second coupling elements 2 and 3 be arranged in any raster of a pallet or pallet receiver. Due to the great versatility of the units according to the invention, they need not to be arranged along the direction of a straight axis, but can also be distributed otherwise, e.g. equally spaced along a circle, for special applications. Moreover, it is no longer necessary to have well-defined axes if it is the question of a flexible or resilient one-point or plural-point centration, and in such a case, orientation elements for the axes can be omitted.

What is claimed is:

1. A unit for releasably attaching parts of a palletizing system, comprising: a first coupling element, a second coupling element, a connection arrangement for clamping said first and second coupling elements in the direction of a predetermined clamping axis which passes centrally through said first and second elements; and an elastic radial orienting arrangement including spring means allowing relative displacement between said first and second coupling elements in a direction transverse to said clamping axis, but providing centering forces in radial direction with respect to said clamping axis which act upon said first and second coupling elements when clamping them together; and wherein said spring means includes an array of spring elements encircling said clamping axis and comprising respective projections extending radially about said clamping axis.

2. Unit as claimed in claim 1, wherein said second coupling element has at least one abutment surface extending around said clamping axis to be engaged by said elastic radial orienting arrangement, said spring means being elastically deformed so as to generate said centering forces in radial direction when said first and second coupling elements are clamped together.

3. Unit as claimed in claim 2, wherein said abutment surface is circular in cross-section.

4. Unit as claimed in claim 3, wherein said abutment surface is conical, said spring means engaging smaller and smaller circles of said conical abutment surface, the more said first and second coupling elements are clamped together.

5. A unit for releasably attaching parts of a palletizing system, comprising:

a first coupling element, a second coupling element, a connection arrangement for clamping said first and second coupling elements in the direction of a predetermined clamping axis which passes centrally through said first and second elements; and an elastic radial orienting arrangement including spring means allowing relative displacement between said first and second coupling elements in a direction transverse to said clamping axis, but providing centering forces in radial direction with respect to said clamping axis which act upon said first and second coupling elements when clamping them together;

wherein said spring means providing centering forces in radial direction have a predetermined number of radially projecting protrusions.

6. Unit as claimed in claim 5, wherein said spring means providing centering forces in radial direction are connected to said first coupling element.

7. Unit as claimed in claim 6, wherein said spring means providing centering forces in radial direction are integrally formed with said first coupling element.

8. Unit as claimed in claim 5, wherein said spring means providing centering forces in radial direction have at least three radially projecting protrusions.

9. Unit as claimed in claim 8, wherein said spring means providing centering forces in radial direction have at least four radially projecting protrusions.

10. Unit as claimed in claim 9, wherein said spring means providing centering forces in radial direction have six radially projecting protrusions.

11. Unit as claimed in claim 5, wherein said protrusions are substantially uniformly spaced around said clamping axis.

12. Unit as claimed in claim 5, wherein said connection arrangement comprises
- a bolt element connected to one of said first and second coupling elements;
- a recess for receiving said bolt element which is arranged in the other one of said first and second coupling elements; and
- an axial clamping arrangement between said bolt and said recess.

13. Unit as claimed in claim 12, wherein said axial clamping arrangement comprises
- a pair of radial pressure surfaces, a first one of them being on said first coupling element, a second one of them being on said second coupling element, at least one of said radial pressure surfaces being conical, and
- an annular press body arrangement between said radial pressure surfaces to be pressed by said at least one conical radial pressure surfaces against the other one for engagement.

14. Unit as claimed in claim 12, wherein said annular press body arrangement comprises an annular arrangement of balls.

15. Unit as claimed in claim 1, wherein said axial clamping arrangement comprises axial biasing means forcing at least one of said first and second coupling elements into engagement with at least one of said connection arrangement and said elastic radial orienting arrangement.

16. Unit as claimed in claim 5, further comprising releasing means for disconnecting said first and second coupling elements against clamping provided by said connection arrangement.

17. Unit as claimed in claim 16, wherein said releasing means comprise fluidic actuation means for counteracting the clamping force exerted by said connection arrangement.

18. Unit as claimed in claim 19, wherein said connection arrangement comprises an axial clamping arrangement including:
- a pair of radial pressure surfaces, a first one of them being on said first coupling element, a second one of them being on said second coupling element, at least one of said radial pressure surfaces being conical; and
- an annular press body arrangement between said radial pressure surfaces to be pressed by said at least one conical radial pressure surfaces against the other one for engagement, said releasing means moving at least one of said radial pressure surfaces away from the other one to relieve pressure from said annular press body arrangement.

19. Unit as claimed in claim 1, wherein said connection arrangement comprises:
- a bolt element connected to said first coupling element; a recess for receiving said bolt element which is arranged in the other said second coupling element; and
- an axial clamping arrangement on said first coupling element between said bolt and said recess, and comprising axial biasing means forcing at least one of said first and second coupling elements into engagement with at least one of said connection arrangement and said elastic radial orienting arrangement.

20. Unit as claimed in claim 4, wherein said first and second coupling elements further comprise an axial orientation arrangement.

21. Unit as claimed in claim 20, wherein said axial orientation arrangement comprises at least one contact surface on each of said coupling elements, at least one contact surface of one of said coupling elements facing the respective contact surface of the other of said coupling elements.

22. Unit as claimed in claim 21, wherein said contact surfaces are substantially in a plane perpendicular to said clamping axis.

23. Unit as claimed in claim 21, further comprising means for preventing dirt between said first and second coupling elements.

24. Unit as claimed in claim 23, wherein said dirt preventing means comprise sealing means to be engaged with at least one of said contact surfaces.

25. Unit as claimed in claim 24, wherein said sealing means comprise a sealing ring seated within the range of one of said contact surfaces and engaging the other one of said contact surfaces.

26. Unit as claimed in claim 25, wherein said supply means comprise at least one channel for supplying pressurized air between said first and second element.

27. Unit as claimed in claim 21, wherein said contact surfaces extend around said clamping axis.

28. Unit as claimed in claim 27, wherein each of said coupling elements comprises at least three contact surfaces distributed around said clamping axis.

29. Unit as claimed in claim 28, wherein each of said coupling elements comprises at least four contact surfaces distributed around said clamping axis.

30. Unit as claimed in claim 29, wherein each of said coupling elements comprises six contact surfaces distributed around said clamping axis.

31. Unit as claimed in claim 28, wherein said contact surfaces are substantially uniformly spaced around said clamping axis.

32. A unit for releasably attaching parts of a palletizing system, comprising:
- a first coupling element, a second coupling element, a connection arrangement for clamping said first and second coupling elements in the direction of a predetermined clamping axis which passes centrally through said first and second elements; and
- an elastic radial orienting arrangement including spring means allowing relative displacement between said first and second coupling elements in a direction transverse to said clamping axis, but providing centering forces in radial direction with respect to said clamping axis which act upon said first and second coupling elements when clamping them together;
- wherein said second coupling element has at least one abutment surface extending around said clamping axis to be engaged by said elastic radial orienting arrangement, said spring means being elastically deformed so as to generate said centering forces in radial direction when said first and second coupling elements are clamped together; and
- wherein said spring means providing centering forces in radial direction have a predetermined number of radial protrusions projecting in outward direction, said abutment surface facing said clamping axis.

33. A unit for releasably attaching parts of a palletizing system, comprising:
- a first coupling element, a second coupling element, a connection arrangement for clamping said first and second coupling elements in the direction of a predetermined clamping axis which passes centrally through said first and second elements; and
- an elastic radial orienting arrangement including spring means allowing relative displacement between said first and second coupling elements in a direction transverse to said clamping axis, but providing centering forces in radial direction with respect to said clamping axis which act upon said first and second coupling elements when clamping them together;

wherein said axial clamping arrangement comprises axial biasing means forcing at least one of said first and second coupling elements into engagement with at least one of said connection arrangement and said elastic radial orienting arrangement; and wherein said axial biasing means comprise a plurality of springs arranged around said clamping axis.

34. A unit for releasably attaching parts of a palletizing system, comprising:

a first coupling element, a second coupling element, a connection arrangement for clamping said first and second coupling elements in the direction of a predetermined clamping axis which passes centrally through said first and second elements; and an elastic radial orienting arrangement including spring means allowing relative displacement between said first and second coupling elements in a direction transverse to said clamping axis, but providing centering forces in radial direction with respect to said clamping axis which act upon said first and second coupling elements when clamping them together;

wherein said axial clamping arrangement comprises axial biasing means forcing at least one of said first and second coupling elements into engagement with at least one of said connection arrangement and said elastic radial orienting arrangement; and wherein said axial clamping arrangement comprises a pair of radial pressure surfaces, a first one of them being on said first coupling element, a second one of them being on said second coupling element, at least one of said radial pressure surfaces being conical, and an annular press body arrangement between said radial pressure surfaces to be pressed by said at least one conical radial pressure surfaces against the other one for engagement, said axial biasing means providing pressure acting upon said annular press body.

35. A unit for releasably attaching parts of a palletizing system, comprising:

a first coupling element, a second coupling element, a connection arrangement for clamping said first and second coupling elements in the direction of a predetermined clamping axis which passes centrally through said first and second elements; and an elastic radial orienting arrangement including spring means allowing relative displacement between said first and second coupling elements in a direction transverse to said clamping axis, but providing centering forces in radial direction with respect to said clamping axis which act upon said first and second coupling elements when clamping them together;

wherein said first and second coupling elements further comprise an axial orientation arrangement;

said axial orientation arrangement comprises at least one contact surface on each of said coupling elements, at least one contact surface of one of said coupling elements facing the respective contact surface of the other of said coupling elements;

said unit further comprises means for preventing dirt between said first and second coupling elements; and wherein said dirt preventing means comprise supply means for a fluid between said first and second element.

36. A palletizing apparatus comprising:

at least one pallet; at least one pallet counter-plate, said pallet and said pallet counter-plate each including means for fastening parts; said fastening means comprising a first coupling element fixed to one of said pallet and pallet counter-plate, a second coupling element fixed to the respective other one of said pallet and pallet counter-plate, a connection arrangement for clamping said first and second coupling elements in the direction of a predetermined clamping axis which passes centrally through said first and second elements; and an elastic radial orienting arrangement including spring means allowing relative displacement between said first and second coupling elements in a direction transverse to said clamping axis, but providing centering forces in radial direction with respect to said clamping axis which act upon said first and second coupling elements when clamping them together; and wherein said spring means includes an array of spring elements encircling said clamping axis and comprising respective projections extending radially about said clamping axis.

* * * * *